United States Patent
LaBerge (10) Patent No.: US 7,983,635 B2
(45) Date of Patent: Jul. 19, 2011

(54) SYSTEM AND METHOD FOR CONTROLLING INTERMODULATION INTERFERENCE

(75) Inventor: E. F. Charles LaBerge, Towson, MD (US)

(73) Assignee: Honeywell International Inc., Morristown, NJ (US)

( * ) Notice: Subject to any disclaimer, the term of this patent is extended or adjusted under 35 U.S.C. 154(b) by 1027 days.

(21) Appl. No.: 11/780,877

(22) Filed: Jul. 20, 2007

(65) Prior Publication Data

US 2009/0023403 A1    Jan. 22, 2009

(51) Int. Cl.
*H04B 1/04*    (2006.01)
(52) U.S. Cl. ..................................... 455/114.2
(58) Field of Classification Search ................ 455/114.2
See application file for complete search history.

(56) References Cited

U.S. PATENT DOCUMENTS

| | | | |
|---|---|---|---|
| 5,006,855 A | | 4/1991 | Braff |
| 5,119,040 A | * | 6/1992 | Long et al. ............... 330/149 |
| 5,375,146 A | | 12/1994 | Chalmers |
| 5,481,592 A | | 1/1996 | Azer |
| 5,915,020 A | | 6/1999 | Tilford et al. |
| 5,940,753 A | | 8/1999 | Mallinckrodt |
| 6,064,861 A | * | 5/2000 | Riley et al. ................. 455/67.13 |
| 6,072,792 A | * | 6/2000 | Mazur et al. ................. 370/345 |
| 6,639,938 B1 | * | 10/2003 | Goyette et al. ............... 375/132 |
| 7,068,971 B2 | | 6/2006 | Abutaleb et al. |
| 7,251,927 B2 | * | 8/2007 | Anderson ..................... 60/204 |
| 2007/0216573 A1 | * | 9/2007 | Handermann et al. ..... 342/357.1 |
| 2007/0224935 A1 | * | 9/2007 | Waxman ..................... 455/41.2 |

FOREIGN PATENT DOCUMENTS

EP    0838106    9/1996

* cited by examiner

*Primary Examiner* — Duc Nguyen
*Assistant Examiner* — Ankur Jain
(74) *Attorney, Agent, or Firm* — Fogg & Powers LLC (57) ABSTRACT

In one embodiment, a method of controlling intermodulation (IM) interference is provided. The method comprises determining if an IM product spectrum overlaps the spectrum of an assigned receive frequency and determining when transmissions from at least two transmitters are to overlap in time. If the IM product spectrum overlaps the assigned receive frequency spectrum, it is determined if a signal is being propagated on the receive frequency when the transmissions from the at least two transmitters are to overlap in time. If a signal is not being propagated on the receive frequency, the at least two transmitters are allowed to transmit the overlapping transmissions; and if a signal is being propagated on the receive frequency, control steps are initiated to reduce the effects of IM interference.

17 Claims, 5 Drawing Sheets

SYSTEM AND METHOD FOR CONTROLLING INTERMODULATION INTERFERENCE

BACKGROUND

Intermodulation (IM) is caused by non-linearities in the radio frequency (RF) path between the transmitter and the receiver in a communication system. These non-linearities may exist within the transmitter amplification and filtering chain, at the transmit antenna, along the propagation path between the transmitter and receiver, within the receiver antenna, or within the receiver downconversion chain. Mathematically, these non-linear signals are described by a power series expansion that describes the output voltage signal, $v_{out}(t)$, in terms of arithmetic powers of the input voltage signal, $v_{in}(t)$, $$v_{out}(t) = \sum_{k=1}^{\infty} g_k v_{in}^k(t)$$

where $g_k$ are the voltage gain coefficients corresponding to the k-th order non linearity. $g_1$ is the nominal linear voltage gain of the device.

Intermodulation distortion occurs when two or more modulated or unmodulated RF carrier signals interact to create undesired signals on frequencies other than the original carrier signals. For example, if the input signal consists of two unmodulated sinusoids of the form $v(t)=A \cos \omega_A t + B \cos \omega_B t$, the k=3 term in the power series expansion above is $$g_3(A\cos\omega_A t + B\cos\omega_B t)^3 =$$

$$g_3 \begin{bmatrix} A^3\left(\frac{3}{4}\cos\omega_A t + \frac{1}{4}\cos 3\omega_A t\right) + \\ A^2 B\left(\frac{3}{2}\cos\omega_B t + \frac{3}{4}\cos(2\omega_A - \omega_B)t + \frac{3}{4}\cos(2\omega_A + \omega_B)t\right) + \\ AB^2\left(\frac{3}{2}\cos\omega_A t + \frac{3}{4}\cos(2\omega_B - \omega_A)t + \frac{3}{4}\cos(2\omega_B + \omega_A)t\right) + \\ B^3\left(\frac{3}{4}\cos\omega_B t + \frac{1}{4}\cos 3\omega_B t\right) \end{bmatrix}$$

All of the expansion terms consist of sinusoidal signals at frequencies $m\omega_A \pm n\omega_B$, where m+n=k. In some embodiments, the value of k is odd. The value of k is referred to as the order of the intermodulation product.

In addition to the frequency translation effects illustrated in the above equation, practical communication systems also have complex amplitude (and phase) modulations A=A(t) and B=B(t). The time domain product illustrated in the above equation, therefore, gives rise to a spectrum-spreading effect due to the convolution of the corresponding frequency-domain spectra, in accordance with the well-known Convolution Theorem of linear systems. Therefore, the intermodulation products exhibit both frequency offsets and bandwidth expansion relative to the original signals $A(t)\cos \omega_A t$ and $B(t)\cos \omega_B t$.

In full-duplex communication systems such as Inmarsat satellite services, the potential for interference exists when these undesired intermodulation products fall on the same RF frequencies used by the receiver. Until mid-2005, Inmarsat assigned channels to aeronautical services of any type that were specifically selected to assure that low-order intermodulation products from multi-carrier radios did not fall in the frequency bands of the receiver. Inmarsat has determined that continuing to provide this frequency management function has an adverse effect on its ability to satisfy the communication demands of its users. Therefore, Inmarsat has determined that it will no longer attempt to manage frequency assignments after 2009.

The decision to end frequency management has raised the possibility that relatively low-order intermodulation products from transceiver transmissions in the Inmarsat uplink band (1626.5 MHz-1660.5 MHz) will fall within the Inmarsat receive band of (1525 MHz-1559 MHz). In such a situation, Inmarsat could effectively interfere with itself. To deal with the possibility of interference, "Classic Aero" channels are, and will continue to be, managed to assure that only high order intermodulation products fall in the GLONASS, GPS, and Inmarsat receive bands. These high order intermodulation products have relatively low amplitude compared to the received signals and low order intermodulation products.

In addition, legacy equipment provides transmit-path filtering to protect these bands. However, new Swift Broadband and some classes of Swift 64 channels will not benefit from such frequency management. Hence, Inmarsat has initiated a development program to produce a new, high-technology transmit-path filter that could be used to provide additional protection in new installations providing Swift Broadband and Swift 64. Unfortunately, such filtering does not, and can not protect any of the frequency bands mentioned above from intermodulation products generated after the filter. Therefore, sources of intermodulation products after the filter, such as transmit antenna intermodulation, continue to be of concern.

For the reasons stated above, and for other reasons stated below which will become apparent to those of skill in the art upon reading and understanding the present specification, there is a need in the art for a system and method to control intermodulation interference.

SUMMARY

In one embodiment, a method of controlling intermodulation (IM) interference is provided. The method comprises determining if an IM product spectrum overlaps the spectrum of an assigned receive frequency and determining when transmissions from at least two transmitters are to overlap in time. If the IM product spectrum overlaps the assigned receive frequency spectrum, it is determined if a signal is being propagated on the receive frequency when the transmissions from the at least two transmitters are to overlap in time. If a signal is not being propagated on the receive frequency, the at least two transmitters are allowed to transmit the overlapping transmissions; and if a signal is being propagated on the receive frequency, control steps are initiated to reduce the effects of IM interference.

DRAWINGS

Features of the present invention will become apparent to those of skill in the art from the following description with reference to the drawings. Understanding that the drawings depict only exemplary embodiments of the present invention and are not to be considered limiting in scope, the invention will be described with additional specificity and detail through the use of the accompanying drawings in which.

DETAILED DESCRIPTION

In the following detailed description, reference is made to the accompanying drawings that form a part hereof, and in which is shown by way of illustration specific illustrative embodiments in which the device may be practiced. These embodiments are described in sufficient detail to enable those skilled in the art to practice the invention, and it is to be understood that other embodiments may be utilized and that changes may be made without departing from the spirit and scope of the present invention. The following detailed description is, therefore, not to be taken in a limiting sense.

Figure 2:
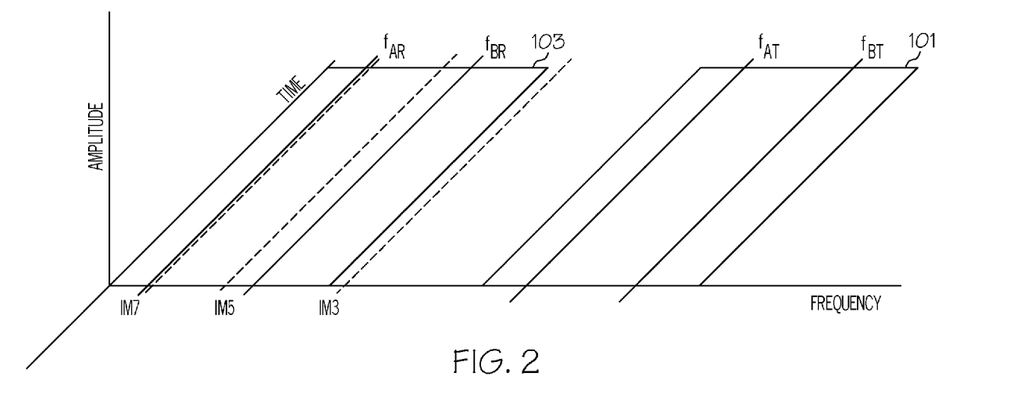
FIG. 2 is a chart depicting exemplary frequency bands and intermodulation products.
Figure 3:
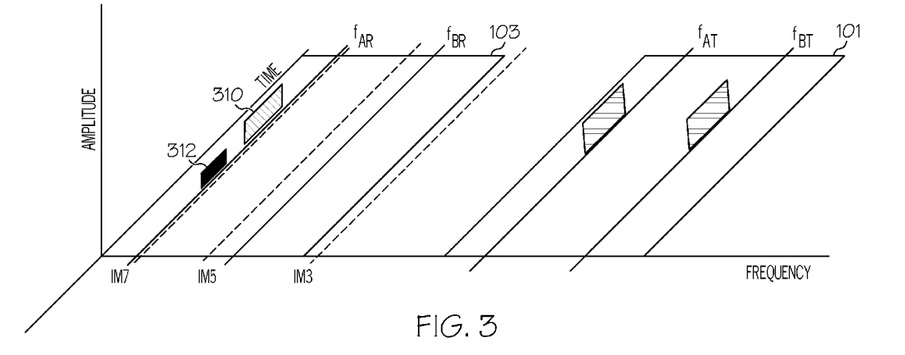
FIG. 3 is another chart depicting an exemplary intermodulation product which does not interfere with the receive band.
Figure 4:
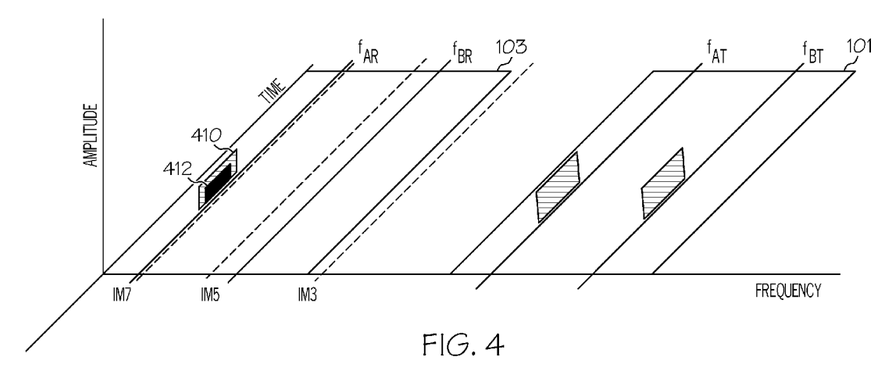
FIG. 4 is another chart depicting an exemplary intermodulation product which does interfere with the receive band.

Embodiments of the present invention enable a multi-carrier radio to reduce the effects of intermodulation interference. In particular, embodiments of the present invention enable a processing unit to selectively take steps to reduce the effects of intermodulation interference when necessary. That is, in some embodiments, the processing unit only takes control steps when an intermodulation product actually poses a risk to proper reception of signals. Therefore, processing time and power are conserved when intermodulation products are either not generated or do not otherwise interfere with proper reception of signals. It should be noted that, for simplicity, only the frequency offsets given by the equation $$g_3(A\cos\omega_A t + B\cos\omega_B t)^3 =$$

$$g_3 \begin{bmatrix} A^3\left(\frac{3}{4}\cos\omega_A t + \frac{1}{4}\cos 3\omega_A t\right) + \\ A^2B\left(\frac{3}{2}\cos\omega_B t + \frac{3}{4}\cos(2\omega_A - \omega_B)t + \frac{3}{4}\cos(2\omega_A + \omega_B)t\right) + \\ AB^2\left(\frac{3}{2}\cos\omega_A t + \frac{3}{4}\cos(2\omega_B - \omega_A)t + \frac{3}{4}\cos(2\omega_B + \omega_A)t\right) + \\ B^3\left(\frac{3}{4}\cos\omega_B t + \frac{1}{4}\cos 3\omega_B t\right) \end{bmatrix}$$

are illustrated in FIGS. 2, 3, and 4. That is, no bandwidth expansion effects are illustrated.

Figure 1:
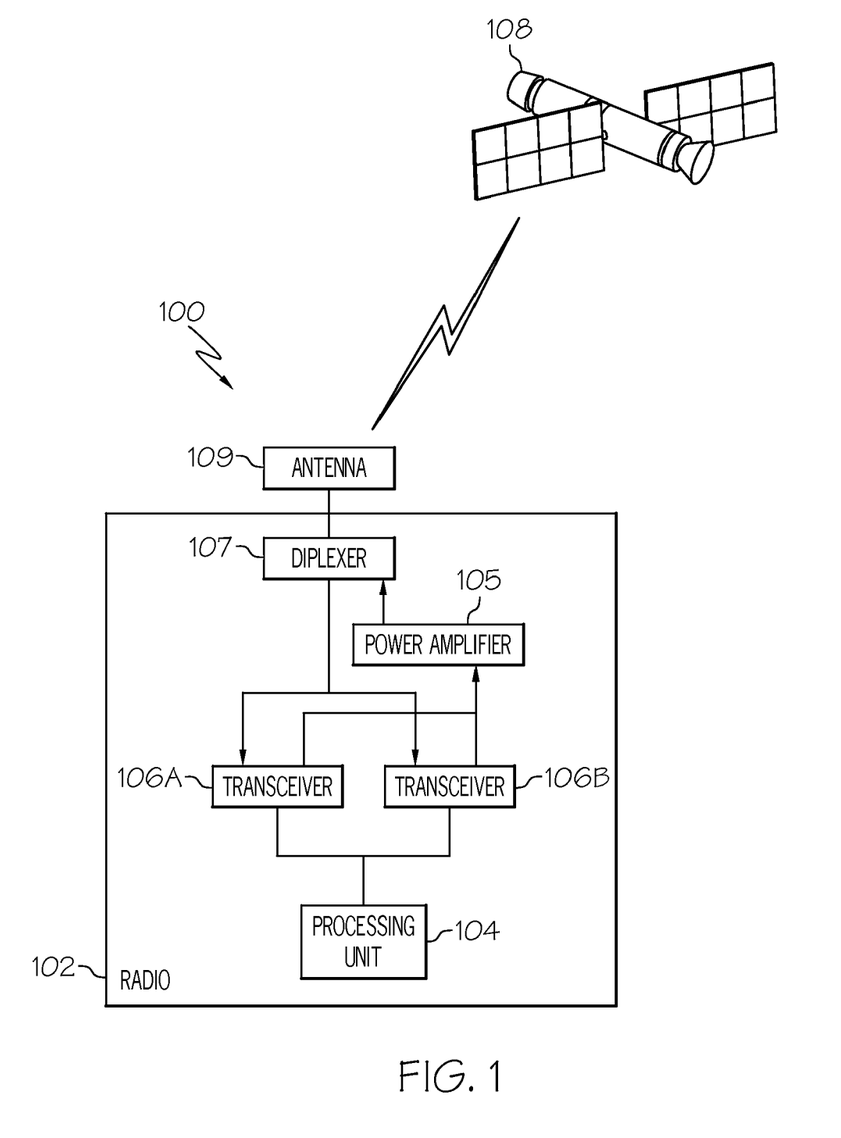
FIG. 1 is a block diagram of a system according to one embodiment of the present invention.

FIG. 1 is a block diagram of a system 100 according to one embodiment of the present invention. System 100 includes a radio 102 in communication with satellite 108. Radio 102 is located on an aircraft in this embodiment. However, embodiments of the present invention are not to be so limited. For example, radio 102 can be used on sea craft or any other appropriate vehicle or stationary system. Radio 102 is a multi-carrier transceiver radio which includes a processing unit 104 and at least two transceivers 106A and 106B. Although only two transceivers 106A and 106B are shown in this example, it is to be understood that any appropriate number of transceivers can be used in other embodiments. In addition, physically separate transmitters and receivers can be used in place of one or both transceivers 106A and 106B in other embodiments.

The modulated outputs of transceivers 106A and 106B are combined in a single power amplifier 105. A diplexer filter 107 is used to filter the composite transmitted waveform consisting of the multiplicity of desired signals (two in this example) and any intermodulation products produced by the amplifier 105. The diplexer filter 107 also separates the intended transmitted signal from the desired received signals. However, filter 107 may be ineffective in providing sufficient protection against the transmitted intermodulation products. The composite transmitted signal is passed through an antenna 109 to the satellite 108. Similarly, the desired received signal (or signals) are received through the antenna 109, passed to the diplexer 107, and thence to the receive ports of transcievers 106A and 106B. Although radio 102 and satellite 108 are described in relation to Inmarsat data service communications (such as Inmarsat-Aero H, Inmarsat-Aero H+, Inmarsat Aero I, etc.), embodiments of the present invention are not to be so limited. In particular, it is to be understood that the system and method described herein can be implemented in a system using other communication protocols susceptible to intermodulation interference, as well as a system that desires to eliminate intermodulation to an independent service in closely proximate spectrum.

Transceivers 106A and 106B each transmit a signal to satellite 108 on an assigned transmit frequency. Similarly, each of transceivers 106A and 106B receive a signal from satellite 108 over an assigned receive frequency. FIG. 2, for example, depicts a graph showing exemplary transmit and receive frequencies for transceivers 106A and 106B. In particular, transceiver 106A transmits on transmit frequency $f_{AT}$ and transceiver 106B transmits on transmit frequency $f_{BT}$ each in transmit frequency band 101. In some embodiments using Inmarsat data service, transmit frequency band 101 comprises the frequencies 1626.5 Mhz-1660.5 Mhz. Similarly, in FIG. 2, transceiver 106A receives signals on receive frequency $f_{AR}$ and transceiver 106B receives signals on receiver frequency $f_{BR}$. In the equivalent embodiment involving Inmarsat data service, receive band 103 comprises the frequencies 1525 Mhz-1559 Mhz. In this Inmarsat communication case, there is a constant offset of 101.5 Mhz between the transmit frequency and the corresponding receive frequency. For example, if transceiver 106A is instructed to transmit at 1631.5 Mhz, its associated receive frequency is then 1530 Mhz.

Also shown in FIG. 2 are intermodulation frequencies IM3, IM5, and IM7, representing third order (k=3), fifth order (k=5) and seventh order (k=7) intermodulation product frequencies, respectively. As stated above, the possibility exists that non-linearities in the radio frequency path combine to produce intermodulation products on a receive frequency, or close enough to a receive frequency that the bandwidth expanded spectrum of the intermodulation product overlaps the spectrum of the received signal, thereby causing an interference event. For example, in the exemplary graph in FIG. 2, intermodulation frequency IM7 falls on the receive frequency $f_{AR}$ corresponding to transceiver 106A. As can be seen in the graph in FIG. 3, as long as an intermodulation product 310 does not occur at the same time a receive signal 312 is being propagated on frequency $f_{AR}$, then no intermodulation distortion or interference is encountered. However, as shown in FIG. 4, when an intermodulation product 410 does occur at the same time as a receive signal 412, the receive signal 412 can be lost if the intermodulation product 410 has a larger amplitude at the transceiver input. The intermodulation product 410 will frequently have a larger amplitude than the receive signal 412 since the intermodulation product 410 only travels a short distance, whereas the receive signal 412 travels approximately 22,000 miles from satellite 108 to transceiver 106A.

Processing unit 104 is configured to control the transmission of signals via transceivers 106A and 106B in order to limit the effects of intermodulation distortion. In some embodiments, a transmit schedule, such as time division multiple access (TDMA), is used. Each transceiver 106A and 106B has its own independent transmit schedule since each is transmitting on a separate frequency. Processing unit 104 analyzes each of the transmit schedules to determine when the transceivers 106A and 106B are scheduled transmission times that overlap. In other embodiments, a transmit schedule is not used and each transceiver 106A and 106B transmits once it has data ready to transmit and its respective channel is clear. In such embodiments, processing unit 104 controls when each of transceivers 106A and 106B is allowed to transmit based in part on the activity of the other transceiver. For example, when transceiver 106A is ready to transmit, processing unit 104 determines if the transceiver 106B is also ready to transmit or is already transmitting prior to allowing transceiver 106A to transmit. If transceiver 106B is not transmitting or is not ready to transmit, processing unit 104 allows transmission from transceiver 106A to proceed.

However, if both transceiver 106A and 106B are about to transmit, processing unit 104 determines if a signal is being received on a receive frequency which is potentially affected by intermodulation products, such as frequency $f_{AR}$ in FIG. 2. For example, if the receive signals are sent to radio 102 on a set time schedule, processing unit 104 analyzes the time schedule for the receive frequency in question to determine if a receive signal is scheduled to be received. In other embodiments, processing unit 104 causes the transceiver associated with the receive frequency to listen for a set period of time to determine if a signal is being received on the receive frequency.

If a signal is being received on the receive frequency, processing unit 104 causes one of transceivers 106A and 106B to delay transmitting its signal. For example, in some embodiments, processing unit 104 causes the transceiver with the lower priority signal to delay transmission of the signal. The delayed signal is then transmitted at a later time (in the next available time slot, for example). If both signals have the same priority and are intended to begin transmission at the same moment, the signal with the longer transmit time is delayed, in some embodiments. Delaying the signal with the longer transmit time results in shorter delays. In other embodiments, when both signals have the same priority, one signal is chosen at random to be delayed. However, if one signal is already being transmitted, the "first to transmit" is allowed to continue and the "second to transmit" is delayed regardless of the priority of the respective signals.

By delaying transmission from one of tranceivers 106A and 106B, an intermodulation product is not produced, thereby preventing interference with the received signal due to intermodulation products. Further details of one embodiment of the process implemented by processing unit 104 to control the effects of intermodulation distortion are described below with respect to FIG. 5.

In some embodiments, rather than delaying the transmission of a signal from one of transceivers 106A and 106B, processing unit 104 instructs transceiver 106A to drop the signal being received. The determination to drop a signal being received or which transceiver to delay is based, in some embodiments, on the international and national standards for priority, precedence, and preemption of safety communications known to one of ordinary skill in the art. For example, if the signals to be transmitted over each of transceivers 106A and 106B are time critical safety communications, processing unit 104 allows the signals to be transmitted and drops the signal being received.

In addition to delaying transmission or dropping a received signal, processing unit 104 is configured, in some embodiments, to modify the strength of signals transmitted from one or both of transceivers 106A and 106B to control the effects of intermodulation interference. In particular, processing unit 104 is configured to cause transceivers 106A and 106B to intentionally generate and measure the amplitude or power of intermodulation products falling within the receive band. For example, the intentional intermodulation products can be generated and measured as part of system self-test actions. Such tests establish the intermodulation performance of the installed equipment, including any aging or corrosion effects. Processing unit 104 then compares the measured amplitude of intermodulation products with a threshold. If the amplitude is below the threshold, the intermodulation product will not cause interference with received signals. Therefore, no corrective action needs to be taken if the amplitude is below the threshold. However, in some embodiments, the transmission power (signal strength) is set by the communications protocol itself and can not be independently adjusted. In such embodiments, individual adjustment of the signal strength is not an option.

Processing unit 104 includes or functions with software programs, firmware or other computer readable instructions for carrying out various methods, process tasks, calculations, and control functions, used in controlling intermodulation interference. These instructions are typically tangibly embodied on any appropriate medium used for storage of computer readable instructions or data structures. Such computer readable media includes any available media that can be accessed by a general purpose or special purpose computer or processing unit, or any programmable logic device.

Suitable computer readable media comprise, for example, non-volatile memory devices including semiconductor memory devices such as EPROM, EEPROM, or flash memory devices; magnetic disks such as internal hard disks or removable disks (e.g., floppy disks); magneto-optical disks; CDs, DVDs, or other optical storage disks; nonvolatile ROM, RAM, and other like media. Any of the foregoing may be supplemented by, or incorporated in, specially-designed application-specific integrated circuits (ASICs). When information is transferred or provided over a network or another communications connection (either hardwired, wireless, or a combination of hardwired or wireless) to a computer, the computer properly views the connection as a computer readable medium. Thus, any such connection is properly termed a computer readable medium. Combinations of the above are also included within the scope of computer readable media.

Figure 5:
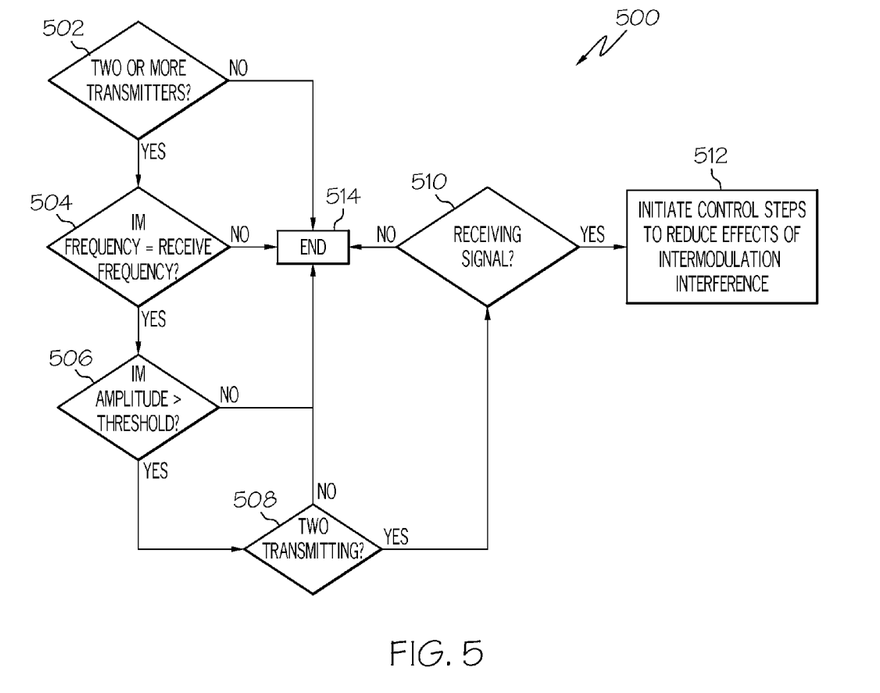
FIG. 5 is a flow chart depicting a method of controlling intermodulation interference according to one embodiment of the present invention.

FIG. 5 is a flow chart showing a method 500 of controlling intermodulation interference according to one embodiment of the present invention. Method 500 can be implemented in computer readable media used by a processing unit such as processing unit 104 described above. At 502, the processing unit determines if there are two or more transmitters (such as transceivers 106A and 106B) in the radio such as radio 102. If only one transmitter is present, method 500 ends at 514. As stated above, intermodulation products are not produced unless two or more transmitters are transmitting simultaneously. Therefore, the check at 502 enables embodiments of the present invention to avoid unnecessary processing if only one transmitter is present.

If at least two transmitters are present in the radio, method 500 continues at 504 where the processing unit determines if an intermodulation (IM) product frequency falls on one of the assigned receive frequencies. The IM product frequencies and appropriate spectra can be calculated using equations known to one of ordinary skill in the art. Alternatively, the IM product frequencies for varying combinations of transmission frequencies can be stored in a look-up table and retrieved based on the assigned transmission frequencies. If none of the intermodulation product frequencies is such that the intermodulation product spectrum overlaps the desired signal spectrum on one of the assigned receive frequencies, method 500 ends at 514. The check at 504 also avoids unnecessary processing since interference will not occur if the intermodulation product spectra does not overlap the desired signal spectrum on any associated receive frequencies. The intermodulation products may be produced but they will not cause interference so no action needs to be taken.

If at least one of the intermodulation product spectra overlaps the desired signal spectrum, then the processing unit flags the frequency for real-time detection and method 500 continues at 506 where the processing unit determines if the amplitude of the intermodulation product is greater than a predetermined threshold. The amplitude of the intermodulation product is determined by intentionally generating intermodulation products and measuring the amplitude of the IM product on the flagged frequencies. The threshold is determined such that an IM amplitude below the threshold will not interfere with a received signal and an IM amplitude equal to or greater than the threshold will interfere with a received signal. Therefore, if the IM amplitude is lower than the threshold, method 500 ends at 514. If the IM amplitude is equal to or greater than the threshold, method 500 continues at 508.

At 508, the processing unit determines when two transmitters are transmitting simultaneously. Notably, as used herein, the term "simultaneously" is defined as overlapping in time but not necessarily starting and ending at the same moment in time. In other words, the processing unit determines when transmissions from at least two transmitters are to overlap in time even if the transmissions do not start and end at the same time. In one embodiment the processing unit analyzes a transmit schedule for each transmitter to determine when transmissions from the two transmitters are scheduled to overlap. For example, each time a transmitter is ready to transmit the processing unit analyzes the transmit schedule to determine if the transmission is going to overlap a transmission from the other transmitter. In other embodiments, transmit schedules are not used. In such embodiments, each time one of the two transmitters is ready to transmit, the processing unit determines, before permitting the transmission to proceed, if the other transmitter is already transmitting.

If transmissions from the two transmitters are not going to overlap, method 500 ends at 514. However, if transmissions from the two transmitters are going to overlap, the processing unit determines if a signal is being received on the flagged receive frequency at 510. In one embodiment, the processing unit determines if a signal is being received by listening on the flagged frequency for a predetermined amount of time similar to carrier sense multiple access (CSMA) techniques known to one of skill in the art. If no signal is being received on the flagged receive frequency, the IM product will not cause interference. Hence, method 500 ends at 514 if no signal is being received.

However, if a signal is being received on a flagged receive frequency, the processing unit initiates control steps to minimize the effects of intermodulation interference at 512. Control steps to minimize the effects of intermodulation interference include, but are not limited to, delaying transmission from one of the two transmitters, dropping the signal being received, and adjusting the power of the transmission from one or both of the transmitters to reduce the amplitude of the IM product below the pre-determined threshold. The processing unit determines which control steps to initiate based, at least in part, on the international and national standards for priority, precedence, and preemption. For example, if each signal being transmitted from the two transmitters is critical or has a high priority, the processing unit can determine to allow a lower priority receive signal to be dropped. However, in other circumstances, it is not desirable to allow the receive signal to be dropped. In such circumstances, the processing unit can determine to delay transmission from the transmitter with the lower priority signal until the transmitters next scheduled transmission slot.

Although method 500 is discussed in relation to two transmitters transmitting simultaneously, it is to be understood that method 500 can be adapted for use with three or more transmitters transmitting overlapping transmissions. For example, the processing unit can calculate the possible IM product frequencies based on all the possible combinations of transmit frequencies and then check the corresponding receive frequency when each combination of transmit frequencies are to overlap in time.

In some embodiments, method 500 is simplified by eliminating some decision steps, such as steps 504, 506, or 510, and passing directly to the associated "YES" path. Such simplifications might be appropriate for radio designs with advanced hardware performance that may be developed with future technology. The efficiency of the method 500 will be affected with each such elimination. For example, significant benefit can still be obtained if the step 510 is eliminated, although at the cost of occasionally delaying a transmitted signal when no received signal were present.

Although the specific embodiment described herein has focused on the prevention of interference from Inmarsat transmit-induced intermodulation to the Inmarsat receive signal, the method 500 may also be applied to protect either transmit or receive signals in well-defined signals in bands closely proximate to the Inmarsat transmit band. Such bands could include the bands used by Iridium (receive at 1616-1626.5 MHz), Globalstar (transmit 1610-1621.5 MHz), or GPS L1 (receive 1565-1585 MHz). A much simplified version of method 500, consisting of steps 504 and 512 can be used for protection of GPS and GLONASS signals.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method of controlling intermodulation (IM) interference, the method comprising:

determining when transmissions from at least two transmitters are to overlap in time, each of the at least two transmitters assigned a separate transmit frequency; and when transmissions from the two transmitters are to overlap in time:

determining if an IM product spectrum, produced by the at least two transmitters, overlaps the spectrum of an assigned receive frequency;

if the IM product spectrum overlaps the assigned receive frequency spectrum, determining if a signal is being propagated on the assigned receive frequency;

if the signal is not being propagated on the assigned receive frequency, allowing the at least two transmitters to transmit the transmissions that overlap in time; and if the signal is being propagated on the assigned receive frequency, initiating control steps to reduce the effects of IM interference.

2. The method of claim 1, wherein initiating control steps includes at least one of:
   delaying transmission from one of the at least two transmitters;
   adjusting transmission power of at least one of the at least two transmitters; and
   allowing the signal to be dropped.

3. The method of claim 1, wherein initiating control steps includes initiating control steps based on aeronautical priority, precedence, and preemption standards.

4. The method of claim 1, wherein determining if a signal is being propagated on the assigned receive frequency comprises one of:
   listening for a signal on the assigned receive frequency for a predetermined time period; and
   analyzing a receive schedule to determine when a signal is scheduled to be received.

5. The method of claim 1, wherein determining when transmissions from at least two transmitters are to overlap in time includes one of:
   analyzing a transmit schedule for each of the at least two transmitters; and each time one of the at least two transmitters is ready to transmit, determining if
   a transmission is to overlap a transmission from another of the at least two transmitters.

6. The method of claim 1, further comprising:
   if a signal is being propagated on the assigned receive frequency:
   measuring an amplitude of an IM product;
   comparing the measured IM product amplitude to a predetermined threshold;
   allowing the at least two transmitters to transmit the transmissions that overlap in time without initiating control steps if the measured IM product amplitude is below the predetermined threshold; and
   initiating control steps if the measured IM product amplitude is above the predetermined threshold.

7. A multi-carrier radio comprising:
   a plurality of transceivers, each transceiver assigned a transmit frequency and a receive frequency; and
   a processing unit configured to flag each assigned receive frequency for which the processing unit determines that an intermodulation (IM) product spectrum generated by at least two of the plurality of transceivers overlaps a respective assigned receive frequency spectrum;
   wherein the processing unit is configured to check for a signal on each flagged assigned receive frequency when the processing unit determines that the at least two transceivers are to overlap transmissions, the processing unit further configured to initiate control steps to reduce the effects of IM interference when a signal is detected on a flagged assigned receive frequency and to allow the at least two transceivers to overlap transmissions if no signal is detected on a flagged assigned receive frequency.

8. The multi-carrier radio of claim 7, wherein the processing unit is further configured to initiate at least one of a transmission delay for at least one of the at least two transceivers which generate the corresponding IM product spectrum; an adjustment of the transmission power of at least one of the at least two transceivers which generate the corresponding IM product spectrum; and a drop of the signal detected on the corresponding flagged assigned receive frequency.

9. The multi-carrier radio of claim 7, wherein the processing unit is further configured to determine if an amplitude of an IM product generated by at least two of the plurality of transceivers is greater than a predetermined threshold, wherein the processing unit does not initiate control steps if the amplitude of the IM product does not exceed the threshold.

10. The multi-carrier radio of claim 7, wherein the processing unit is further configured to initiate control steps based on aeronautical priority, precedence, and preemption standards.

11. The multi-carrier radio of claim 7, wherein the processing unit determines when the at least two transceivers are to overlap transmissions by analyzing a transmit schedule for each of the at least two transceivers.

12. The multi-carrier radio of claim 7, wherein the plurality of transceivers are configured to transceive signals using an Inmarsat data service.

13. A program product comprising program instructions embodied on a processor-readable medium for execution by a programmable processor, wherein the program instructions are operable to cause the programmable processor to:
   determine when transmissions from at least two transmitters are to overlap in time, each transmitter assigned a separate frequency;
   determine a spectrum of an intermodulation (IM) product generated by the at least two transmitters;
   determine if the IM product spectrum overlaps a spectrum of an assigned receive frequency;
   if the IM product spectrum overlaps the assigned receive frequency spectrum, determine if a signal is being propagated on an assigned receive frequency when transmissions from the at least two transmitters are to overlap in time;
   allow the transmissions from the at least two transmitters to overlap if a signal is not being propagated on the assigned receive frequency; and
   initiate control steps to reduce the effects of IM interference if a signal is being propagated on the assigned receive frequency when transmissions from the at least two transmitters are to overlap in time and the IM product spectrum overlaps the assigned receive frequency spectrum.

14. The program product of claim 13, wherein the program instructions are further operable to cause the programmable processor to initiate one of:
   delaying transmission from one of the at least two transmitters;
   adjusting transmission power of at least one of the at least two transmitters; and
   allowing the signal propagated on the assigned receive frequency to be dropped.

15. The program product of claim 13, wherein the program instructions are further operable to cause the programmable processor to initiate control steps based on aeronautical priority, precedence, and preemption standards.

16. The program product of claim 13, wherein the program instructions are further operable to cause the programmable processor to determine when transmission from the at least two transmitters are to overlap by analyzing a transmit schedule for each of the at least two transmitters.

17. The program product of claim 13, wherein the program instructions are further operable to cause the programmable processor to:
   measure an amplitude of a test IM product on a receive frequency;
   compare the measured test IM product amplitude to a predetermined threshold;

and allow the at least two transmitters to transmit the transmissions that overlap in time without initiating control steps if the measured test IM product amplitude is below the predetermined threshold; and
initiate control steps if the measured test IM product amplitude is above the predetermined threshold.

* * * * *